(12) United States Patent
Robinson

(10) Patent No.: US 6,301,030 B1
(45) Date of Patent: Oct. 9, 2001

(54) POLARIZATION MULTIPLEXER, DEMULTIPLEXER, AND METHOD

(75) Inventor: Kevin Cyrus Robinson, Zionsville, PA (US)

(73) Assignee: Lucent Technologies, Inc., Holmdel, NJ (US)

( * ) Notice: Subject to any disclaimer, the term of this patent is extended or adjusted under 35 U.S.C. 154(b) by 0 days.

(21) Appl. No.: 09/134,734

(22) Filed: Aug. 14, 1998

(51) Int. Cl.[7] .................................................... H04J 14/06

(52) U.S. Cl. ............................................. 359/122; 359/494

(58) Field of Search .................................... 359/122, 129, 359/131, 156, 494–496

(56) References Cited

U.S. PATENT DOCUMENTS

| | | | |
|---|---|---|---|
| 3,671,747 | * | 6/1972 | Duguay ................................ 250/199 |
| 5,111,322 | * | 5/1992 | Bergano et al. ..................... 359/122 |
| 5,113,458 | * | 5/1992 | Taylor .................................... 385/11 |
| 5,223,975 | * | 6/1993 | Naganuma et al. ................. 359/487 |
| 5,982,539 | * | 11/1999 | Shirasaki .............................. 359/484 |

* cited by examiner

*Primary Examiner*—Kinfe-Michael Negash

(57) ABSTRACT

A birefringent wedge is used to multiplex beams of the same or similar wavelength. The multiplexing system has a compact construction and does not require beam splitters or right angle prisms. The birefringent wedge may also be used to polarization demultiplex an incoming multiplexed communication beam. The invention may be used to increase the data-carrying capacity of optical fiber.

40 Claims, 2 Drawing Sheets

POLARIZATION MULTIPLEXER, DEMULTIPLEXER, AND METHOD

BACKGROUND OF THE INVENTION

1. Field of the Invention

The present invention relates generally to the field of optical devices and systems. More particularly, the invention relates to a system for multiplexing polarized signals for simultaneous transmission through a communication fiber. The invention also relates to a system for demultiplexing a beam into polarized components.

2. Description of the Related Art

In the prior art, optical fiber capacity has been increased by multiplexing signals of different wavelengths. The technique is known as wavelength division multiplexing (WDM). A problem with wavelength division multiplexing is that the propagation rate of light is wavelength dependent. Consequently, the different propagation rates of different signals must be taken into account to accurately extract all transmitted information. Wavelength division multiplexing is also limited by the number of different wavelength signals that can be accommodated in a single mode fiber under commercial conditions.

There is a need in the art for a convenient system for multiplexing signals of the same or similar wavelength.

SUMMARY OF THE INVENTION

The disadvantages of the prior art are overcome to a great extent by the present invention, in which signals having substantially the same wavelength but different polarizations are multiplexed into a single beam. The multiplexed beam may be transmitted through a single mode fiber without interference between the two signals. The signals may be polarization demultiplexed at a downstream location.

In one aspect of the invention, a compact multiplexing system is provided with first and second sources (such as pump lasers) for producing first and second linearly polarized signal beams, and a birefringent device for combining the two beams into a single multiplexed beam.

In a preferred embodiment of the invention, the birefringent device is in the form of a wedge, with first and second planar surfaces arranged at an angle to each other. The first and second surfaces are not parallel to each other. The polarized beams are incident on the first surface. The multiplexed beam exits through the second surface. Thus, the multiplexing system is arranged to align and linearly walk the polarized beams together such that they are parallel and coincident with each other as they exit the birefringent wedge.

The birefringent wedge may be formed of a suitable uniaxial crystal material, such as rutile. The birefringent wedge may be a modified walkoff plate or prism.

In another aspect of the invention, a single graded index lens is used to collimate the signal beams and launch them into the birefringent wedge. In a preferred embodiment, the lens causes the signal beams to slightly diverge from each other, such that they are differentially refracted into a parallel condition by the birefringent wedge.

In a preferred embodiment of the invention, the multiplexed beam is focused into a communication fiber by a second graded index lens. The birefringent lens may be sandwiched between the two graded index lenses to form a compact, uncomplicated apparatus. An advantage of the invention is that it can be constructed as a compact package, without using any beam splitters or right angle prisms.

The present invention also relates to a communication system with a multiplexer for launching a polarization multiplexed signal into a single mode fiber, and a downstream demultiplexer for separating polarization dependent signals from the multiplexed signal. In a preferred embodiment of the invention, the demultiplexer may be formed of essentially the same components as those of the multiplexer, but arranged in reverse.

A retarder mechanism may be provided to align the polarized components of the multiplexed signal. The retarder mechanism may be controlled to maximize the strength (intensity) of the demultiplexed signals. The retarder mechanism may be, for example, a set of paddles that are actively tuned to provide a desired amount of retardance.

The present invention also relates to a method of multiplexing optical signals. Thus, in one aspect of the invention, linearly polarized signal beams are independently generated by separately modulating respective lasers. A birefringent wedge combines the beams into a single multiplexed beam. The multiplexed beam is propagated through a single mode fiber, and polarization demultiplexed at a downstream location.

The present invention permits a single optical fiber, or optical capillary, to transmit, without interference or interaction, two beams of light that are of the same or similar wavelength. Thus, the present invention may be used to increase fiber data capacity by at least two fold, over known wavelength division multiplexing/demultiplexing techniques. The invention may also be used to provide pump laser diversity in optical amplifiers.

These and other features and advantages of the invention will become apparent from the following detailed description of preferred embodiments of the invention.

DETAILED DESCRIPTION OF PREFERRED EMBODIMENTS

Figure 1:
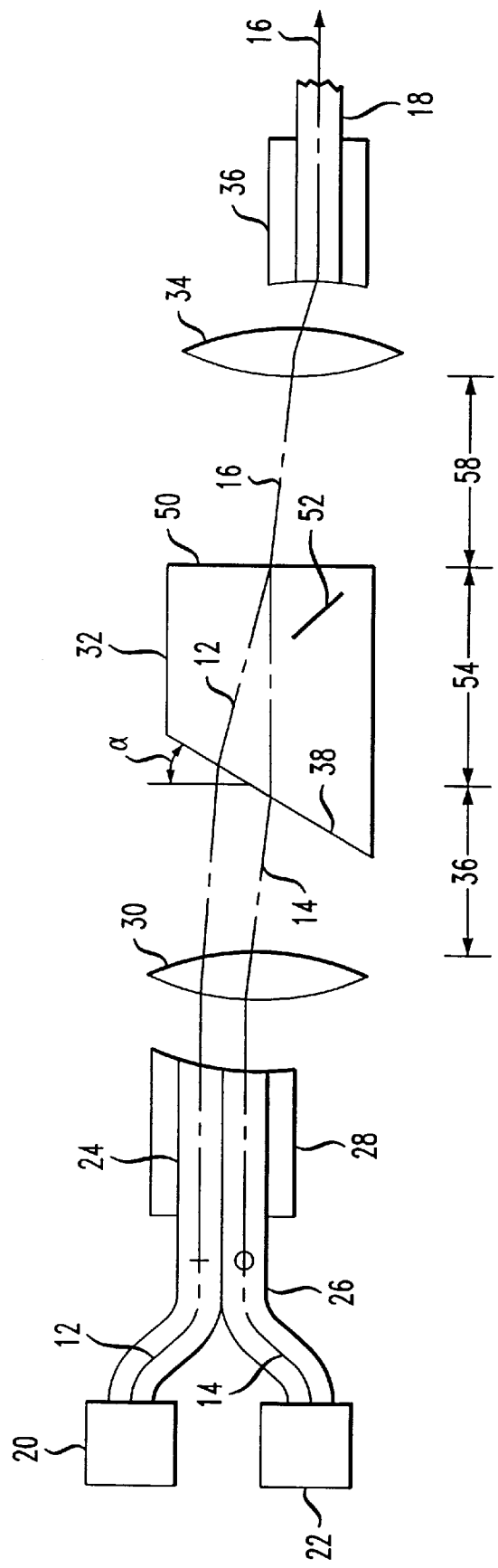
FIG. 1 is a schematic diagram of a polarization multiplexer constructed in accordance with the present invention.

Referring now to the drawings, where like reference numerals designate like elements, there is shown in FIG. 1 a multiplexing system 10 constructed in accordance with a preferred embodiment of the invention. The system 10 takes orthogonally polarized light beams 12, 14, multiplexes them into a single beam 16, and launches the multiplexed beam 16 into a communication fiber 18. As the multiplexed beam 16 propagates through the fiber 18, the polarized components 12, 14 do not interact or become scrambled. Consequently, the components 12, 14 may be polarization demultiplexed at a downstream location.

The polarized beams 12, 14 may be produced by respective pump lasers 20, 22. The lasers 20, 22 are modulated independently of each other. The beams 12, 14 may have substantially the same wavelength, such that they would interfere with each other if they had the same polarization. In the illustrated embodiment, the wavelength of each beam 12, 14 is about 1550 nanometers. The beams 12, 14 are linearly polarized by the lasers 20, 22. The polarization of the first beam 12 is preferably orthogonal to that of the second beam 14. The orthogonal polarization states are designated in the drawings by the symbols "+" and "o."

The pump lasers 20, 22 are connected to the multiplexing system 10 by polarization maintaining fibers 24, 26. The system 10 has a capillary 28 for receiving the ends of the fibers 24, 26. In the illustrated embodiment, the capillary 28 is a two fiber termination device (DFT).

The multiplexing system 10 also has a first lens 30, a birefringent wedge 32, and a second lens 34. The first lens 30 collimates the polarized beams 12, 14 and transmits them toward the wedge 32. The birefringent wedge 32 walks the beams 12, 14 together, to form the single multiplexed beam 16, as discussed in more detail below. The second lens 34 transmits the multiplexed beam 16 into a single fiber termination (SFT) 36 coupled to the end of the communication fiber 18. An advantage of the illustrated embodiment is that only a single lens 30 is required between the capillary 28 and the wedge 32, and only a single lens 34 is required downstream of the wedge 32. Moreover, the invention may be advantageously constructed without any epoxy in the optical path.

The first lens 30 preferably has a graded index (GRIN). The ends of the input fibers 24, 26 (at the capillary 28) are preferably beveled by about 8 degrees to match the contour of the first lens 30. The polarized beams 12, 14 are skewed with respect to each other as they emerge from the first lens 30. In the illustrated embodiment, between the first lens 30 and the wedge 32, the beams 12, 14 diverge away from each other by an angle of about 3.6 degrees.

The birefringent wedge 32 may be formed of rutile (a positive uniaxial crystal) or another suitable material. In the illustrated embodiment, the indices of refraction of the rutile material at 1550 manometers are $n_e$=2.710 and $n_o$=2.454, and Δn=10.4%. Other suitable materials, especially birefringent materials having refraction indices of about 2.5 and Δn of about 10%, may be used to construct the wedge 32. The present invention is not limited to the illustrated embodiment.

The wedge 32 has a first planar surface 38, a second planar surface 50, and a crystal axis 52. The surfaces 38, 50 are not coplanar. The first surface 38 forms an angle α of about 18 degrees with respect to the second surface 50. The crystal axis 52 is oriented at 45+/−2 degrees with respect to the second surface 50.

In operation, the diverging beams 12, 14 are differentially refracted toward each other as they enter the birefringent wedge 32. The beams 12, 14 have different polarizations and therefore see different refractive indices (ordinary and extraordinary) in the wedge 32. The angle α between the surfaces 38, 50 of the wedge 32 is such that the beams 12, 14 become substantially parallel to each other as they exit the wedge 32 at the second surface 50. In addition, the length 54 of the wedge 32 is such that the beams 12, 14 walk onto each other and become substantially coincident, forming the single multiplexed beam 16.

The second lens 34 may have a graded index. The output lens 34 focuses the multiplexed beam 16 into the single fiber termination 36. The end of the communication fiber 18 is beveled to match the surface of the second lens 34. The communication fiber 18 may be a single mode silica based fiber.

In the illustrated embodiment, the distance 56 from the first lens 30 to the first surface 38 of the wedge 32 is about 2 millimeters. The distance 58 from the second wedge surface 50 to the second lens 34 is also about 2 millimeters. The length 54 of the wedge 32 is a function of the distance 56 from the first lens 30 to the first wedge surface 38. In the illustrated embodiment, the length 54 of the birefringent wedge 32 is 1.3+/−0.1 millimeters.

It has been found that attenuation loss caused by the birefringent wedge 32 can be reduced by controlling the wedge angle α. In the illustrated embodiment, if the angle α is maintained within +/−0.13 degrees of the desired angle (18 degrees), the wedge 32 may cause a loss of 0.5 decibel. Where the angle α is more closely maintained within a tolerance of +/−0.08 degrees, the wedge 32 may cause a loss of 0.2 decibel. Where the angle α is maintained within +/−0.06 degrees, the wedge 32 may cause a loss of no more than about 0.1 decibel.

Figure 2:
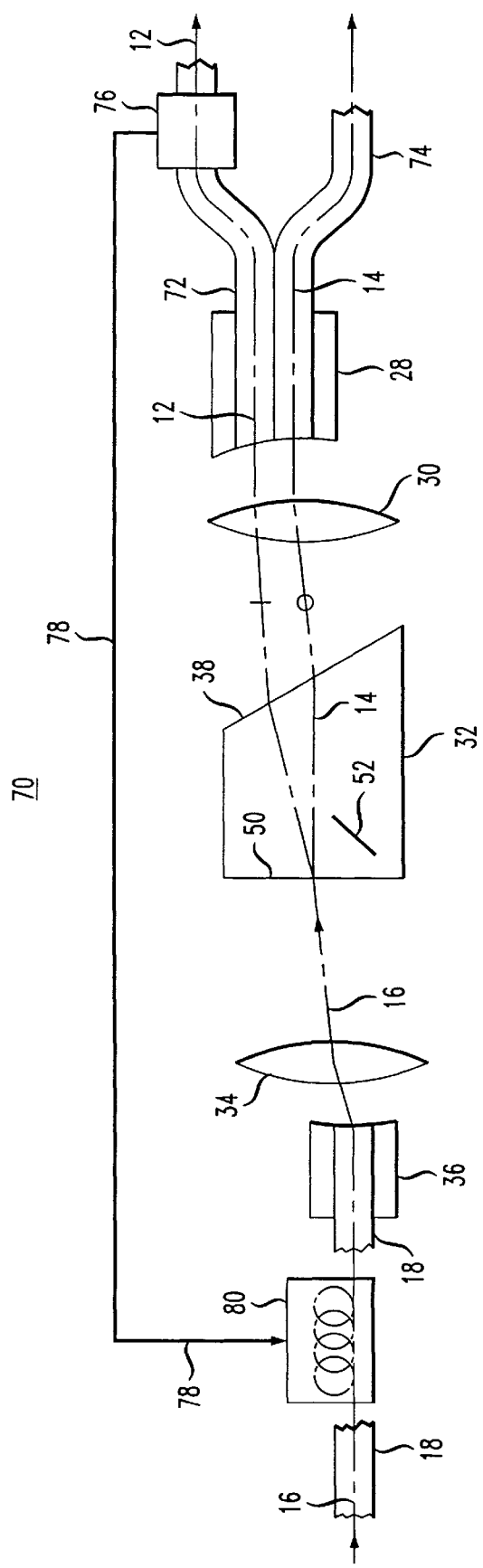
FIG. 2 is a schematic diagram of a polarization demultiplexer constructed in accordance with the present invention.

A demultiplexing system 70 constructed in accordance with the present invention is shown in FIG. 2. The demultiplexing system 70 may be used to demultiplex an incoming beam 16 into orthogonally polarized component beams 12, 14. The demultiplexing system 70 employs essentially the same optical devices discussed above in connection with FIG. 1. The arrangement and relative positions of the devices may be the same in both systems 10, 70 except that the devices are arranged in reverse in the demultiplexing system 70.

In operation, an incoming beam 16 is collimated by the second lens 34 and transmitted through the second surface 50 of the birefringent wedge 32. The wedge 32 separates the beam 16 into orthogonally polarized beams 12, 14. The signal beams 12, 14 are converged by the first lens 30 into respective fibers 72, 74. The strength of the signal in the first signal fiber 72 is monitored by a monitoring device 76. The monitoring device 76 is operatively connected by a feedback mechanism 78 to an adjustable retarding mechanism 80. The retarding mechanism 80 is located in series with the incoming fiber 18. The retarding mechanism 80 rotates one of the polarized signals 12 with respect to the other 14 to maximize the strength of the signal 12 at the monitoring device 76.

The retarding mechanism 80 may be, for example, an FPC-1 fiber polarization controller (retarding device) marketed by Fiber Control Industries. Alternatively, the retarding mechanism 80 may be a polarization controller of the type shown in U.S. Pat. No. 5,659,412 (Hakki).

The demultiplexing system 70 may be used to demultiplex a beam 16 created by the multiplexing system 10 of FIG. 1. The present invention should not be limited, however, to the use of the demultiplexing system 70 in combination with the multiplexing system 10. The multiplexed beam 16 may be demultiplexed by other systems, such as systems which employ beam splitters and/or dichroic materials.

The above descriptions and drawings are only illustrative of preferred embodiments which achieve the features and advantages of the present invention, and it is not intended that the present invention be limited thereto. Any modification of the present invention which comes within the spirit and scope of the following claims is considered part of the present invention.

What is claimed as new and desired to be protected by Letters Patent of the United States is:

1. A multiplexing system, comprising:
   a first source for transmitting a first polarized beam;
   a second source for transmitting a second polarized beam; and
   a birefringent device for combining the first and second polarized beams into a single multiplexed beam, and wherein the polarizations of the first and second beams are such that the first and second beams do not interfere with each other in the multiplexed beam.

2. The multiplexing system of claim 1, wherein the polarization of the second polarized beam is substantially orthogonal to the polarization of the first polarized beam.

3. The multiplexing system of claim 2, wherein said first and second sources include pump lasers for generating said first and second polarized beams.

4. The multiplexing system of claim 3, wherein said pump lasers operate at substantially the same wavelength.

5. The multiplexing system of claim 4, wherein said first and second sources include polarization maintaining fibers connected to said pump lasers.

6. The multiplexing system of claim 2, wherein said birefringent device has a first surface for receiving said first and second polarized beams and a second surface for transmitting said single multiplexed beam, said first surface being non-coplanar with respect to said second surface.

7. The multiplexing system of claim 6, wherein said birefringent device includes rutile.

8. The multiplexing system of claim 6, further comprising a graded index lens located between said sources and said birefringent device.

9. An optical system for combining first and second linearly polarized beams of the same or similar wavelength without interference, said optical system comprising:
    a birefringent device for refracting the linearly polarized beams toward each other and for linearly walking the linearly polarized beams onto each other; and
    a graded index collimator lens for transmitting the linearly polarized beams toward said birefringent device.

10. The optical system of claim 9, further comprising first and second optical fibers for transmitting the linearly polarized beams toward said collimator lens.

11. The optical system of claim 9, further comprising a communication fiber, and a second graded index lens for launching a single beam of light into said communication fiber.

12. The optical system of claim 9, wherein said birefringent device includes rutile.

13. A communication system, comprising:
    a first source for producing a first polarized beam;
    a second source for producing a second polarized beam, the polarization of the second polarized beam being different than the polarization of the first polarized beam;
    a birefringent device for combining the first and second polarized beams into a single multiplexed beam;
    a communication fiber for transmitting the multiplexed beam; and
    a demultiplexing system for separating the multiplexed beam into separate signals corresponding to the first and second polarized beams.

14. The communication system of claim 13, wherein said communication fiber includes single mode fiber.

15. The communication system of claim 13, wherein said demultiplexing system includes birefringent material.

16. The communication system of claim 13, wherein said demultiplexing system includes a birefringent wedge having non-coplanar surfaces.

17. The communication system of claim 16, further comprising a polarization controller for changing the composite polarization of the single multiplexed beam.

18. The communication system of claim 17, further comprising a feedback system for operating said polarization controller in response to the strength of one of the signals.

19. A communication system, comprising:
    a first source for producing a first polarized beam;
    a second source for producing a second polarized beam, the polarization of the second polarized beam being orthogonal to the polarization of the first polarized beam, and the wavelength of the first polarized beam being substantially the same as the wavelength of the second polarized beam;
    a birefringent wedge for combining the first and second polarized beams into a single multiplexed beam, said wedge having a first surface for receiving the first and second polarized beams, said wedge having a second surface for transmitting the single multiplexed beam, said first surface being non-coplanar with said second surface;
    a graded index lens for collimating the first and second polarized beams, said graded index lens being located between said first and second sources and said birefringent wedge;
    a communication fiber for transmitting the multiplexed beam; and
    a demultiplexing system for separating the multiplexed beam into separate polarized signals corresponding to the first and second polarized beams.

20. The communication system of claim 19, wherein said first and second sources include independently modulated lasers.

21. The communication system of claim 20, wherein the wavelength of the first and second polarized beams is about 1550 nanometers.

22. The communication system of claim 21, wherein said first and second surfaces of said birefringent wedge form an angle of about 18 degrees.

23. The communication system of claim 22, further comprising a second graded index lens for launching the multiplexed beam into said communication fiber.

24. A demultiplexing system, comprising:
    a birefringent wedge for separating a communication beam into polarized signal beams;
    a first graded index lens for transmitting the communication beam toward said birefringent wedge; and
    a second graded index lens for transmitting the signal beams into respective optical fibers.

25. The demultiplexing system of claim 24, wherein the polarized signal beams are substantially orthogonally polarized.

26. The demultiplexing system of claim 25, further comprising a retarding and feedback mechanism for changing the polarization state of the communication beam as a function of the strength of one of the signal beams.

27. The demultiplexing system of claim 26, wherein said birefringent wedge has a first surface for receiving the multiplexed beam and a second surface for transmitting the signal beams, said first surface being non-coplanar with respect to said second surface.

28. The demultiplexing system of claim 27, wherein said birefringent wedge has refractive indices of about 2.5 at 1550 nanometers.

29. An optical signal multiplexing method, said method comprising the steps of:
    generating first and second polarized signal beams, said beams having substantially the same wavelength;
    combining said polarized signal beams into a multiplexed beam; and
    transmitting said multiplexed beam into a single mode fiber; and
    wherein said step of combining said polarized signal beams into said multiplexed beam includes the step of transmitting said signal beams through a birefringent material.

30. The method of claim 29, wherein said first and second signal beams are substantially orthogonally polarized.

31. The method of claim 30, wherein the wavelength of said orthogonally polarized signal beams is about 1550 nanometers.

32. The method of claim 30, wherein said generating step includes the step of modulating said first signal beam independently of said second signal beam, and wherein said first and second signal beams are not separated from each other prior to said combining step.

33. The method of claim 30, further comprising the step of transmitting said first and second signal beams through a first graded index lens.

34. The method of claim 33, further comprising the step of transmitting said multiplexed beam through a second graded index lens, said second lens being located between said birefringent material and said single mode fiber.

35. The method of claim 34, wherein said birefringent material includes rutile.

36. The method of claim 35, further comprising the step of demultiplexing said multiplexed beam to generate signals representative of said first and second orthogonally polarized signal beams.

37. An optical signal demultiplexing method, said method comprising the steps of:
  propagating a polarization multiplexed beam through a single mode fiber;
  separating said multiplexed beam into first and second polarized signal beams, said signal beams having substantially the same wavelength; and
  monitoring at least one of said signal beams; and
  wherein said step of separating said multiplexed beam includes the step of transmitting said multiplexed beam through birefringent material.

38. The method of claim 37, wherein said first and second signal beams are substantially orthogonally polarized.

39. The method of claim 38, further comprising the step of transmitting said first and second signal beams through a first graded index lens.

40. The method of claim 39, further comprising the step of transmitting said multiplexed beam through a second graded index lens, said second graded index lens being located between said birefringent material and said single mode fiber.

* * * * *